(12) United States Patent
Moidu

(10) Patent No.: US 11,845,257 B2
(45) Date of Patent: Dec. 19, 2023

(54) ASSEMBLY OF COMPONENTS HAVING DIFFERENT COEFFICIENTS OF THERMAL EXPANSION

(71) Applicant: Lumentum Operations LLC, San Jose, CA (US)

(72) Inventor: Abdul Jaleel K. Moidu, Nepean (CA)

(73) Assignee: Lumentum Operations LLC, San Jose, CA (US)

( * ) Notice: Subject to any disclaimer, the term of this patent is extended or adjusted under 35 U.S.C. 154(b) by 176 days.

(21) Appl. No.: 17/304,248

(22) Filed: Jun. 17, 2021

(65) Prior Publication Data

US 2021/0308983 A1 Oct. 7, 2021

Related U.S. Application Data

(60) Continuation of application No. 15/601,424, filed on May 22, 2017, now Pat. No. 11,040,514, which is a division of application No. 13/938,657, filed on Jul. 10, 2013, now Pat. No. 9,656,439.

(51) Int. Cl.
| | |
|---|---|
| *G02B 7/02* | (2021.01) |
| *B32B 7/027* | (2019.01) |
| *G02B 7/18* | (2021.01) |
| *G02B 7/00* | (2021.01) |
| *F16B 1/00* | (2006.01) |

(52) U.S. Cl.
CPC .............. *B32B 7/027* (2019.01); *G02B 7/008* (2013.01); *G02B 7/028* (2013.01); *G02B 7/181* (2013.01); *F16B 2001/0078* (2013.01); *Y10T 403/217* (2015.01)

(58) Field of Classification Search
CPC .... Y10T 403/217; G02B 6/36; G02B 6/3616; G02B 7/00; G02B 7/02; G02B 7/025; G02B 7/008; G02B 7/181
See application file for complete search history.

(56) References Cited

U.S. PATENT DOCUMENTS

| | | | |
|---|---|---|---|
| 4,895,430 | A | 1/1990 | Jalink, Jr. et al. |
| 5,084,123 | A | 1/1992 | Curtis et al. |
| 6,640,032 | B2 | 10/2003 | Kondo et al. |
| 6,825,997 | B2 | 11/2004 | Hubbard et al. |
| 6,954,311 | B2 | 10/2005 | Amanai |
| 8,036,502 | B2 | 10/2011 | Duricic et al. |
| 8,215,850 | B2 | 7/2012 | Yalamanchili et al. |
| 8,292,537 | B2 | 10/2012 | Newswander et al. |
| 8,342,756 | B2 | 1/2013 | Moidu et al. |
| 8,587,882 | B2 | 11/2013 | Wippermann et al. |

(Continued)

*Primary Examiner* — Michael P Ferguson
(74) *Attorney, Agent, or Firm* — Harrity & Harrity, LLP

(57) ABSTRACT

A component assembly includes a first component, such as an optical component, and a second component, such as a support component, having different coefficients of thermal expansion (CTEs). The component assembly also includes a spacer having a CTE matched to that of the first component, disposed between the first component and the second component. When the CTE of the first component is greater than that of the second component, the second component includes a protrusion, and the spacer includes a complementary opening for receiving the protrusion, such that a joint between the protrusion and the complementary opening is under compressive stress. The spacer also includes a mounting area for receiving the first component, and an air gap disposed between the first component and the protrusion.

15 Claims, 4 Drawing Sheets

(56) References Cited

U.S. PATENT DOCUMENTS

| | | |
|---|---|---|
| 8,836,100 B2 | 9/2014 | Nadeau et al. |
| 9,656,439 B2 | 5/2017 | Moidu |
| 11,040,514 B2 | 6/2021 | Moidu |

ASSEMBLY OF COMPONENTS HAVING DIFFERENT COEFFICIENTS OF THERMAL EXPANSION

RELATED APPLICATION

This application is a continuation U.S. patent application Ser. No. 15/601,424, filed May 22, 2017 (now U.S. Pat. No. 11,040,514), which is a divisional of U.S. patent application Ser. No. 13/938,657, filed Jul. 10, 2013 (now U.S. Pat. No. 9,656,439), the contents of which are incorporated herein by reference in their entireties.

TECHNICAL FIELD OF THE INVENTION

The present invention relates to an assembly of components having different coefficients of thermal expansion (CTEs), such as an optical component and a support component. More particularly, the present invention relates to a component assembly including a spacer.

BACKGROUND OF THE INVENTION

Free-space optical modules, such as wavelength-selective switches (WSSs), require a high thermo-mechanical stability. The central wavelength of an optical channel must be maintained within a very narrow wavelength band over a range of operating temperatures, e.g., about 0° C. to about 70° C. Furthermore, insertion loss must be minimized over the range of operating temperatures.

Optical components, such as lenses and prisms, are often formed of materials, such as optical glasses, having a relatively low temperature coefficient of refractive index (dn/dT), in order to reduce temperature-dependent performance degradation. Unfortunately, low-dn/dT materials often have relatively high coefficients of thermal expansion (CTEs).

Typically, optical components in an optical system are joined to a support component, such as an optical bench, by adhesive. The support component is usually formed of a material having a relatively low CTE, in order to lessen thermal expansion of the optical system. The CTE mismatch between the optical components and the support component may lead to high tensile stresses in the optical components, which are often relatively brittle, and in the adhesive joints between the optical components and the support component. In some instances, the CTE mismatch may lead to catastrophic failure, such as fracture of an optical component, upon thermal cycling, shock, or vibration. In other instances, the CTE mismatch may lead to performance degradation, as a result of movement, e.g., tilt, or distortion, e.g., a change in surface curvature, of an optical component.

To alleviate the CTE mismatch, one or more spacers having an intermediate CTE may be disposed between an optical component and a support component, as disclosed in U.S. Pat. No. 6,825,997 to Hubbard, et al., issued on Nov. 30, 2004, and in U.S. Pat. No. 8,292,537 to Newswander, issued on Oct. 23, 2012, for example, which are incorporated herein by reference. In general, the spacers and the components in these disclosures are joined by planar adhesive joints or by fasteners.

SUMMARY OF THE INVENTION

An object of the present invention is to provide an assembly of components having different coefficients of thermal expansion (CTEs) with a high thermo-mechanical stability.

Accordingly, the present invention relates to an assembly of components having different CTEs, the assembly comprising: a first component having a first CTE; a second component having a second CTE different from the first CTE; and a spacer, disposed between the first component and the second component, having a third CTE substantially matched to the first CTE and different from the second CTE, the spacer including: a mounting area for receiving the first component; one of a protrusion and a complementary opening for receiving the protrusion, wherein the second component includes the other one of the protrusion and the complementary opening, wherein the second component includes the protrusion and the spacer includes the complementary opening when the third CTE is greater than the second CTE, and wherein the spacer includes the protrusion and the second component includes the complementary opening when the third CTE is less than the second CTE, such that a joint between the protrusion and the complementary opening is under compressive stress; and an air gap, disposed between the first component and the protrusion.

BRIEF DESCRIPTION OF THE DRAWINGS

The present invention will be described in greater detail with reference to the accompanying drawings wherein.

DETAILED DESCRIPTION OF THE INVENTION

Figure 1:
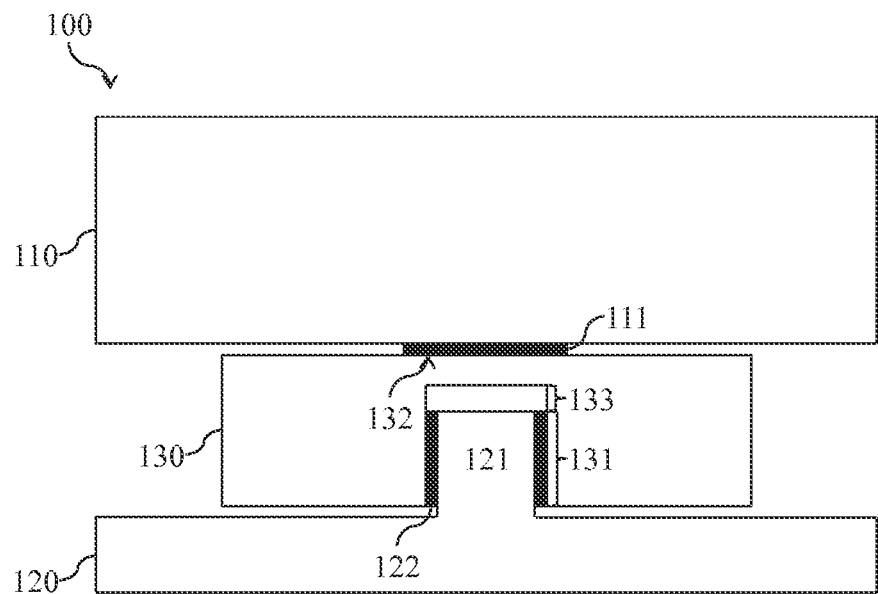
FIG. 1 is a cross-sectional schematic illustration of a component assembly according to a first embodiment of the present invention.

The present invention provides an assembly of components having different coefficients of thermal expansion (CTEs), such as an optical component and a support component. The component assembly reduces tensile stresses arising from the CTE mismatch between the components, while providing a strong and stable attachment of the components. Consequently, the component assembly has a high thermo-mechanical stability.

The component assembly includes a first component having a first CTE and a second component having a second CTE different from the first CTE. The first CTE may be greater than or less than the second CTE. Typically, the first CTE and the second CTE differ in magnitude by about 5 ppm/° C., preferably, by at least about 3 ppm/° C. Typically, the first CTE and the second CTE differ in magnitude by at most about 10 ppm/° C. The component having the greater CTE is referred to as a high-CTE component, and the component having the lesser CTE is referred to as a low-CTE component.

Often, the component assembly forms part of an optical module, such as a wavelength-selective switch (WSS). In most instances, the first component is an optical component, i.e., an optical element, such as a lens, a prism, a mirror, or a diffraction grating, and the second component is a support component, such as an optical bench, a platform, a package, or a housing. Typically, the optical component is formed of an optical glass, such as N-BK7 or fused silica, having a CTE greater than about 6 ppm/° C. and less than about 10 ppm/° C. The support component may be formed of a metal, such as aluminum, a ferrous alloy, such as invar, a ceramic, such as alumina or aluminum nitride, or a glass, such as fused silica or pyrex, and may have a wide range of CTEs. In some instances, the first component and the second component are each support components formed of different materials.

The first component and the second component are attached through a spacer disposed between the components. The spacer has a third CTE substantially matched to the first CTE of the first component. Accordingly, the difference between the first CTE of the first component and the third CTE of the spacer is smaller in magnitude than both the difference between the first CTE and the second CTE of the second component and the difference between the second CTE and the third CTE. Generally, the difference between the first CTE and the third CTE is small enough in magnitude to avoid significant tensile stress in a joint between the first component, e.g., a brittle optical component, and the spacer.

The second CTE of the second component and the third CTE of the spacer, typically, differ in magnitude by about 5 ppm/° C., preferably, by at least about 3 ppm/° C. Typically, the second CTE and the third CTE differ in magnitude by at most about 10 ppm/° C. The material of the spacer is chosen so that, typically, the first CTE of the first component and the third CTE of the spacer differ in magnitude by at most about 2 ppm/° C., preferably, by at most about 1 ppm/° C. The spacer is, typically, formed of a ferrous alloy, such as alloy-48 or kovar.

The component assembly has different embodiments depending on whether the third CTE of the spacer is greater than or less than the second CTE of the second component, i.e., depending on whether the first component, to which the spacer is CTE-matched, is the high-CTE component or the low-CTE component. In general, the spacer includes one of a protrusion and a complementary hole for receiving the protrusion, and the second component includes the other one of the protrusion and the complementary opening. More specifically, whichever of the second component and the spacer has the lesser CTE includes the protrusion, and whichever of the second component and the spacer has the greater CTE includes the complementary opening. Advantageously, the difference between the second CTE and the third CTE is large enough in magnitude to provide a compressive joint between the protrusion and the complementary opening. The joint is formed at an elevated temperature, and, upon cooling, the greater contraction of the complementary opening relative to the protrusion results in compressive stress.

In all embodiments of the component assembly, the spacer also includes a mounting area for receiving the first component, and an air gap disposed between the first component and the protrusion. The air gap serves to further isolate, i.e., decouple, the first component from the second component. Thereby, thermo-mechanical distortion of the first component resulting from the CTE mismatch between the first component and the second component is minimized, improving the thermo-mechanical stability of the component assembly.

Certain embodiments of the component assembly are described in further detail hereafter. However, the present invention is not limited to these embodiments, which are provided by way of example only.

With reference to FIG. 1, a first embodiment of the component assembly 100 includes a high-CTE first component 110, a low-CTE second component 120, and a high-CTE spacer 130. Both the first CTE of the first component 110 and the third CTE of the spacer 130 are greater than the second CTE of the second component 120.

For example, the first component 110 may be an optical element formed of N-BK7 glass having a CTE of about 7.1 ppm/° C., the second component 120 may be an optical bench formed of invar having a CTE of about 1.3 ppm/° C., and the spacer 130 may be formed of alloy-48 having a CTE of about 8.5 ppm/° C. For another example, the first component 110 may be a package formed of a ceramic having a CTE of about 7.1 ppm/° C., the second component 120 may be an optical bench formed of invar having a CTE of about 1.3 ppm/° C., and the spacer 130 may be formed of kovar having a CTE of about 6 ppm/° C.

The low-CTE second component 120 includes a protrusion 121, and the high-CTE spacer 130 includes a complementary opening 131 for receiving the protrusion 121. The protrusion 121 and the complementary opening 131 have forms suitable for mating with one another. Preferably, the protrusion 121 has an elliptical or race-track-shaped cross section to facilitate rotational alignment during assembly. Accordingly, the complementary opening 131, preferably, has a corresponding elliptical or race-track-shaped cross section. Alternatively, the protrusion 121 and the complementary opening 131 may each have a circular cross section or a cross section of another suitable shape. Typically, the protrusion 121 and the complementary opening 131 are each substantially uniform in cross section, i.e., substantially straight rather than tapered. The protrusion 121 extends upwards, i.e., vertically, from an upper surface of the second component 120, and the complementary opening 131 extends upwards from a lower surface of the spacer 130.

Lateral surfaces of the protrusion 121 and the complementary opening 131 are joined by adhesive, forming a ring joint 122, e.g., with a thickness of about 50 μm. Preferably, the adhesive is a rigid heat-cure adhesive having a curing temperature of greater than about 100° C. As mentioned heretofore, the ring joint 122 is formed at an elevated temperature, e.g., about 100° C., so that, once cooled, the ring joint 122 is under compressive stress in the radial and circumferential directions. The ring joint 122 remains under compressive stress as long as the temperature of the component assembly 100 remains lower than the temperature at which the ring joint 122 was formed, i.e., the attachment temperature. Accordingly, the attachment temperature, and likewise the curing temperature of the adhesive, should be higher than usual assembly, operational, and storage temperatures of the component assembly 100, e.g., about 0° C. to about 70° C. Advantageously, the ring joint 122 has a relatively large bond size, which increases the mechanical strength and stability of the ring joint 122.

The spacer 130 also includes a mounting area 132 for receiving the first component 110, and an air gap 133. The air gap 133 is disposed within the spacer 130 between the first component 110 and the protrusion 121. Typically, the air gap 133 has a vertical extent, i.e., a height, of about 0.5 mm to about 1 mm.

In the first embodiment, the air gap 133 is integral with the complementary opening 131. Together, the complementary opening 131 and the air gap 133 form a covered hole, e.g., a blind hole. The air gap 133 separates an upper surface of the protrusion 121 from the spacer 130.

The mounting area 132 is disposed on an upper surface of the spacer 130. Typically, the mounting area 132 is planar. The mounting area 132 is joined to a lower surface of the first component 110 by adhesive, e.g., an epoxy, forming a planar joint 111, e.g., with a thickness of about 50 µm.

In the first embodiment, the mounting area 132 is disposed over the covered hole, i.e., the air gap 133 and the complementary opening 131, and the protrusion 121. Typically, the planar joint 111 is circular, elliptical, or race-track shaped. Advantageously, the planar joint 111 is under a favorable state of stress because of the out-of-plane constraint provided by the protrusion 121, i.e., because the edges of the spacer 130 deform up slightly after the ring joint 122 is formed. Typically, the planar joint 111 is under compressive peel stress, which may help to prevent delamination, for example. Preferably, the planar joint 111 extends laterally beyond the covered hole and the protrusion, i.e., the length of the planar joint 111 is greater than the width of the covered hole and the width of the protrusion 121, to maximize the compressive peel stress. However, the lateral extent, i.e., the length, of the planar joint 111 should not be so large that shear stress becomes excessive.

With reference to FIG. 2, an exemplary component assembly 200 according to the first embodiment includes an optical element as the high-CTE first component 210, an optical bench as the low-CTE second component 220, and a high-CTE spacer 230.

Figure 2A:
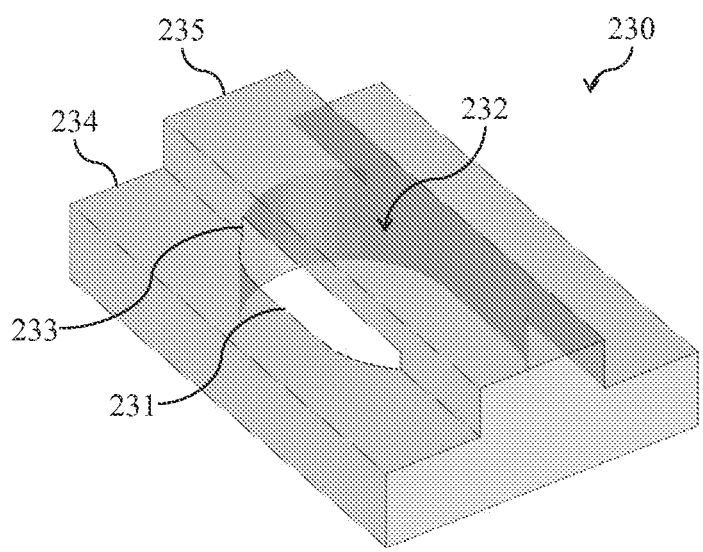
FIG. 2A is an isometric view of the spacer in an exemplary component assembly according to the first embodiment of the present invention.

With particular reference to FIG. 2A, the spacer 230 includes a body 234 and a mounting bar 235. The spacer 230 also includes a complementary opening 231, formed in the body 234, and an air gap 233, formed in the mounting bar 235, which together form a covered hole. The mounting bar 235 extends laterally across the hole, partially covering the hole. Advantageously, this design allows the complementary opening 231 to be accessed from above, facilitating adhesive application and verification. A mounting area 232 is disposed on an upper surface of the mounting bar 235.

Figure 2B:
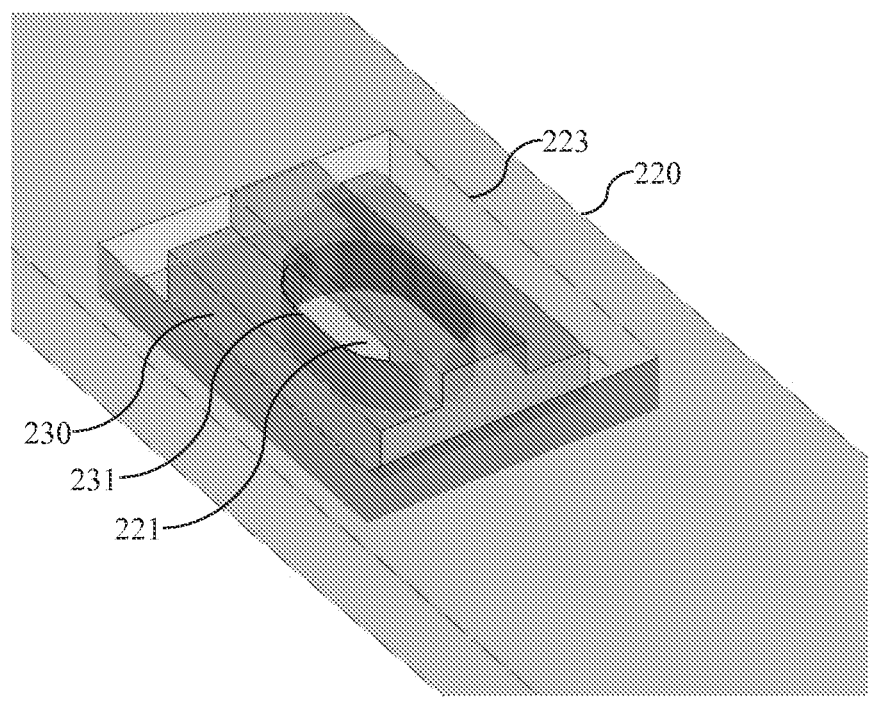
FIG. 2B is an isometric view of the second component and the spacer in the exemplary component assembly.
Figure 2C:
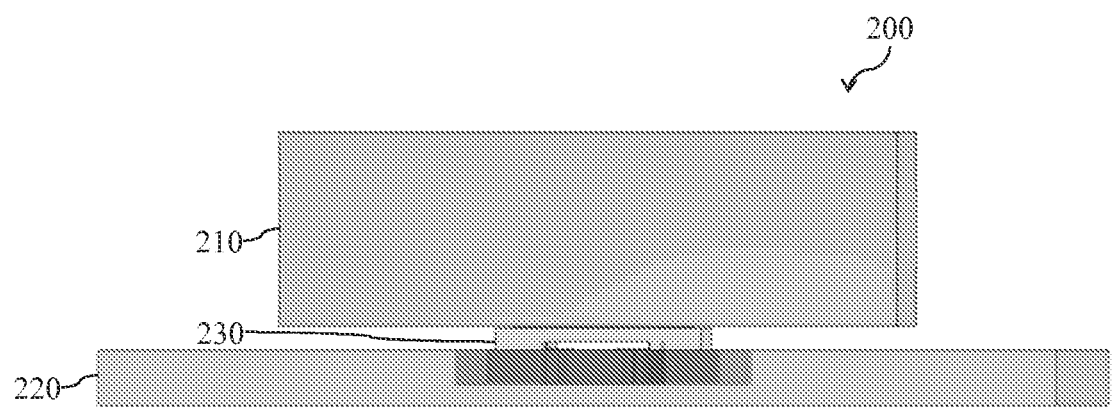
FIG. 2C is a first isometric view of the exemplary component assembly.
Figure 2D:
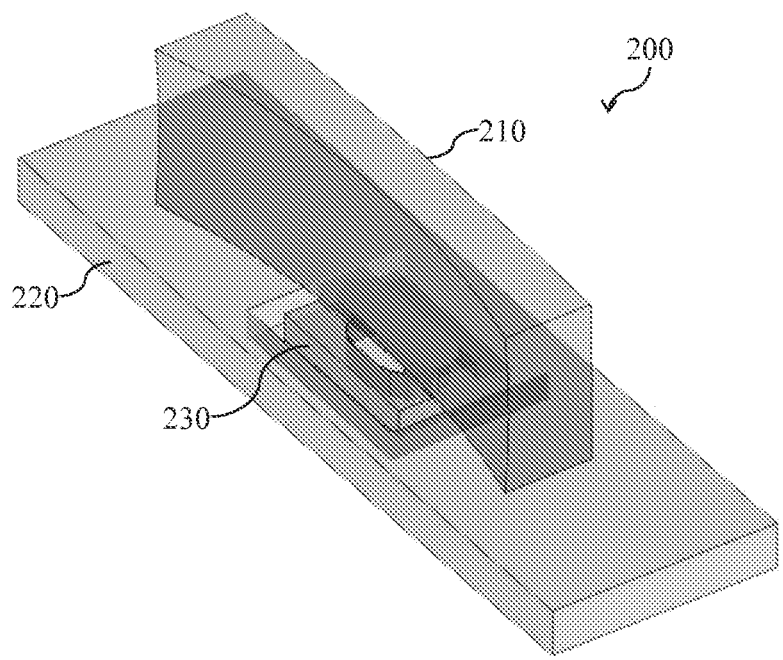
FIG. 2D is a second isometric view of the exemplary component assembly.

With particular reference to FIG. 2B, the spacer 230 is shaped to fit into a recess 223 on the second component 220. A race-track-shaped protrusion 221 within the recess 223 fits into the complementary opening 231 on the spacer 230, which is also race-track-shaped. Lateral surfaces of the protrusion 221 and the complementary opening 231 are joined by adhesive, forming a ring joint that is under compressive stress.

Figure 2E:
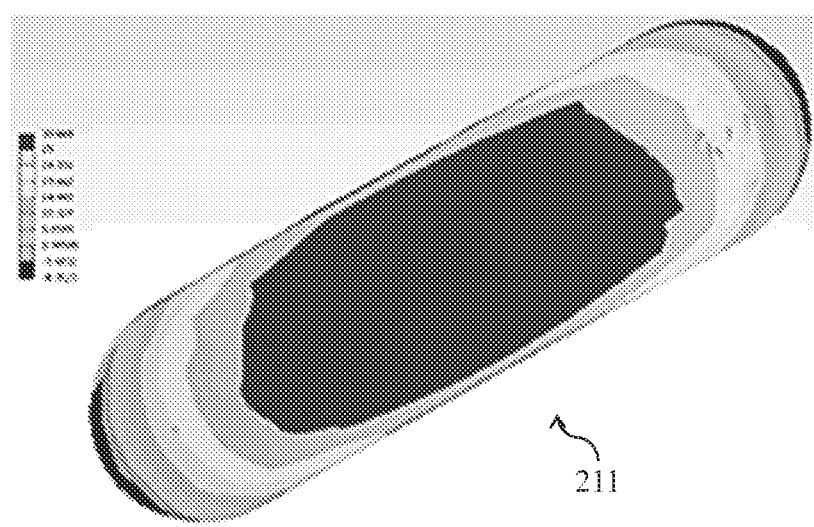
FIG. 2E is a peel-stress contour plot of the planar joint in the exemplary component assembly.

With particular reference to FIGS. 2A and 2C-2E, the first component 210 is mounted on the mounting bar 235 of the spacer 230, more specifically, on the mounting area 232 on the upper surface thereof. The mounting area 232 is joined to a lower surface of the first component 210 by adhesive, forming a planar joint 211. The planar joint 211 is race-track-shaped and extends laterally beyond the covered hole and the protrusion, i.e., the length of the planar joint 211 is greater than the width of the covered hole and the width of the protrusion 221. In FIG. 2E, a peel-stress contour plot for the planar joint 211 shows that the peel stress on the planar joint 211 is substantially compressive, as explained heretofore.

Figure 3:
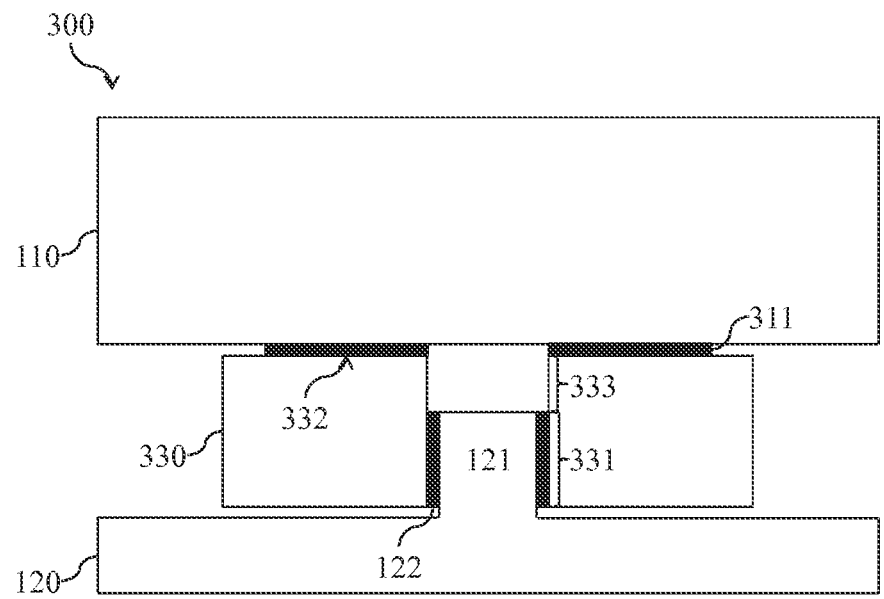
FIG. 3 is a cross-sectional schematic illustration of a component assembly according to a second embodiment of the present invention.

With reference to FIG. 3, a second embodiment of the component assembly 300 is similar to the first embodiment, but includes a spacer 330 having a different design. Aspects of the second embodiment that are different from the first embodiment are described hereafter.

The spacer 330 includes a complementary opening 331, a mounting area 332, and an air gap 333. As in the first embodiment, the air gap 333 is integral with the complementary opening 331. However, in the second embodiment, the complementary opening 331 and the air gap 333 together form a through hole, which extends vertically through the spacer 330, i.e., from a lower surface of the spacer 330 to an upper surface of the spacer 330. The air gap 333 separates the upper surface of the protrusion 121 from the lower surface of first component 110.

As in the first embodiment, the mounting area 332 on the upper surface of the spacer 330 is joined to the lower surface of the first component 110 by adhesive, forming a planar joint 311. However, in the second embodiment, the mounting area 332 is not disposed over the through hole, i.e., the air gap 333 and the complementary opening 331, and the protrusion 121, but rather surrounds the through hole. In other words, the mounting area 332 is annular. Accordingly, the planar joint 311 is also annular. Therefore, the mechanical strength and stability of the planar joint 311 may be reduced relative to the first embodiment. Nevertheless, the simpler design of the second embodiment may be desirable in some instances.

Figure 4:
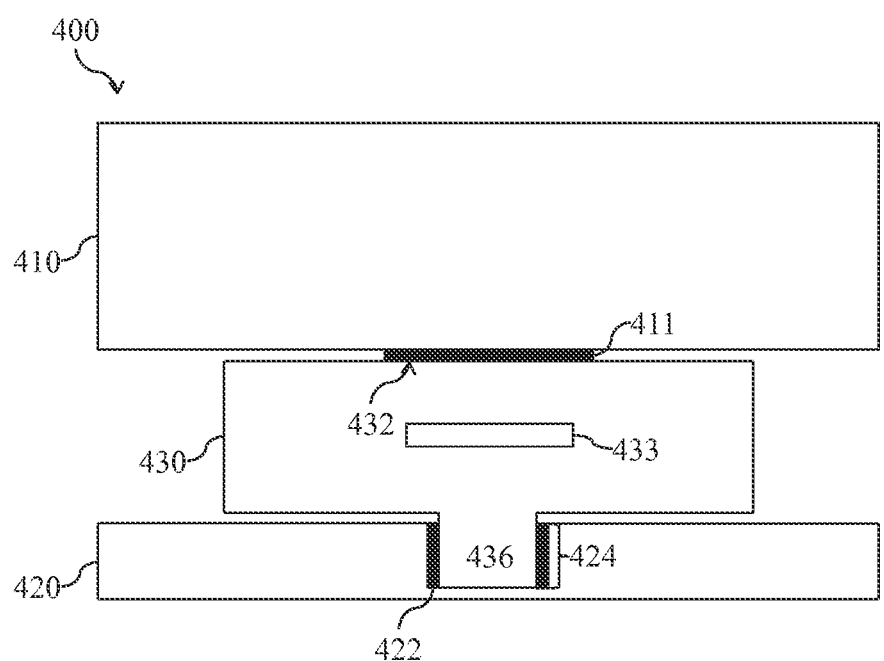
FIG. 4 is a cross-sectional schematic illustration of a component assembly according to a third embodiment of the present invention.

With reference to FIG. 4, a third embodiment of the component assembly 400 is similar to the first embodiment, but includes a low-CTE first component 410, a high-CTE second component 420, and a low-CTE spacer 430 having a different design. Aspects of the third embodiment that are different from the first embodiment are described hereafter.

Both the first CTE of the first component 410 and the third CTE of the spacer 430 are less than the second CTE of the second component 420. For example, the first component 410 may be an optical element formed of N-BK7 glass having a CTE of about 7.1 ppm/° C., the second component 420 may be an optical bench formed of low-cost aluminum having a CTE of about 23 ppm/° C., and the spacer 430 may be formed of alloy-48 having a CTE of about 8.5 ppm/° C.

In the third embodiment, the spacer 430 includes a protrusion 436, and the second component 420 includes a complementary opening 424 for receiving the protrusion 436. The protrusion 436 extends downwards from a lower surface of the spacer 430, and the complementary opening 424 extends downwards from an upper surface of the second component 420. The complementary opening 424 is, typically, a blind hole, but may also be a through hole in some instances. As in the first embodiment, lateral surfaces of the protrusion 436 and the complementary opening 424 are joined by adhesive, forming a ring joint 422 that is under compressive stress.

The spacer 430 also includes a mounting area 432 and an air gap 433. The air gap 433 is disposed within the spacer 430 between the first component 410 and the protrusion 436. In the third embodiment, the air gap 433 is separate from the complementary opening 424. Typically, the air gap 433 is a slit extending laterally through the spacer 430, i.e., between opposite lateral surfaces of the spacer 430.

As in the first embodiment, the mounting area 432 on an upper surface of the spacer 430 is joined to a lower surface of the first component 410 by adhesive, forming a planar joint 411. In the third embodiment, the mounting area 432 is disposed over the air gap 433 and the protrusion 436. Typically, the planar joint 411 is circular, elliptical, or race-track shaped. Preferably, the planar joint 411 extends laterally beyond the air gap 433 and the protrusion 436, i.e., the length of the planar joint 411 is greater than the width of the slit-shaped air gap 433 and the width of the protrusion 436.

In general, the various embodiments of the component assembly are fabricated by the following method. Adhesive is applied to the lateral surfaces of the protrusion and/or the complementary opening, the protrusion is inserted into the complementary opening, and the adhesive is heat-cured at an elevated temperature, e.g., about 100° C., to form the ring joint between the second component and the spacer. Adhesive is then applied to the mounting area on the upper surface of the spacer, the lower surface of the first component is mounted on the mounting area, and the adhesive is cured, typically, at an elevated temperature, e.g., about 100° C., or, in some instances, at a lower temperature, to form the planar joint between the first component and the spacer.

Of course, numerous other embodiments may be envisaged without departing from the spirit and scope of the invention.

I claim:

1. An assembly comprising:
   a first component comprising an optical component having a first coefficient of thermal expansion (CTE);
   a second component comprising an optical support component having a second CTE different from the first CTE; and
   a spacer, disposed between the first component and the second component, having a third CTE different from the second CTE, the spacer including:
   an annular body having opposing upper and lower surfaces disposed at opposing axial ends of the annular body,
   wherein the annular body defines a hole in a center portion of the annular body axially extending between the upper and lower surfaces of the annular body; and
   a mounting area disposed on the upper surface of the annular body for receiving the first component,
   wherein the mounting area and a lower surface of the first component are joined via an adhesive;
   wherein the second component includes a protrusion axially extending from an upper surface of the second component into the hole in the center portion of the annular body, such that a joint between the protrusion and the spacer is under compressive stress;
   wherein the first component, the protrusion, and the annular body define, within the hole in center portion of the annular body, a first air gap disposed between the lower surface of the first component and the protrusion and surrounded by the annular body; and
   wherein the protrusion is adhered within the hole in center portion of the annular body to define a second air gap disposed between the upper surface of the second component and the lower surface of the annular body.

2. The assembly of claim 1, wherein the optical component comprises one or more of:
   a lens,
   a prism,
   a mirror, or
   a diffraction grating.

3. The assembly of claim 1, wherein the optical support component comprises one or more of:
   an optical bench,
   an optical platform,
   an optical package, or
   an optical housing.

4. The assembly of claim 1, wherein the third CTE is substantially matched to the first CTE.

5. The assembly of claim 1, wherein the first CTE and the third CTE are less than the second CTE.

6. An optical module, comprising:
   a first component comprising an optical component having a first coefficient of thermal expansion (CTE);
   a second component comprising a support component having a second CTE different from the first CTE; and
   a spacer, disposed between the first component and the second component, having a third CTE different from the second CTE, the spacer including:
   an annular body having opposing upper and lower surfaces disposed at opposing axial ends of the annular body,
   wherein the annular body defines a hole in a center portion of the annular body axially extending between the upper and lower surfaces of the annular body; and
   a mounting area disposed on the upper surface of the annular body for receiving the first component;
   wherein the mounting area and a lower surface of the first component are joined via an adhesive;
   wherein the second component includes a protrusion axially extending from an upper surface of the second component into the hole in the center portion of the annular body, such that a joint between the protrusion and the spacer is under compressive stress;
   wherein the first component, the protrusion, and the annular body define, within the hole in the center of the annular body, a first air gap disposed between the lower surface of the first component and the protrusion and surrounded by the annular body; and
   wherein the protrusion is adhered within the hole in the center portion of the annular body to define a second air gap disposed between the upper surface of the second component and the lower surface of the annular body.

7. The optical module of claim 6, wherein the optical component comprises one or more of:
   a lens,
   a prism,
   a mirror, or
   a diffraction grating.

8. The optical module of claim 6, wherein the support component comprises one or more of:
   an optical bench,
   an optical platform,
   an optical package, or
   an optical housing.

9. The optical module of claim 6, wherein the third CTE is substantially matched to the first CTE.

10. The optical module of claim 6, wherein the first CTE and the third CTE are less than the second CTE.

11. A wavelength selective switch, comprising:
    a first component comprising an optical component having a first coefficient of thermal expansion (CTE);
    a second component comprising a support component having a second CTE different from the first CTE; and
    a spacer, disposed between the first component and the second component, having a third CTE different from the second CTE, the spacer including:
    an annular body having opposing upper and lower surfaces disposed at opposing axial ends of the annular body,
    wherein the annular body defines a hole in a center portion of the annular body axially extending between the upper and lower surfaces of the annular body; and a mounting area disposed on the upper surface of the annular body for receiving the first component;

wherein the mounting area and a lower surface of the first component are joined via an adhesive;

wherein the second component includes a protrusion axially extending from an upper surface of the second component into the hole in the center portion of the annular body, such that a joint between the protrusion and the spacer is under compressive stress;

wherein the first component, the protrusion, and the annular body define, within the hole in the center of the annular body, a first air gap disposed between the lower surface of the first component and the protrusion and surrounded by the annular body; and wherein the protrusion is adhered within the hole in the center portion of the annular body to define a second air gap disposed between the upper surface of the second component and the lower surface of the annular body.

12. The wavelength selective switch of claim 11, wherein the optical component comprises one or more of:
   a lens,
   a prism,
   a mirror, or
   a diffraction grating.

13. The wavelength selective switch of claim 11, wherein the support component comprises one or more of:
   an optical bench,
   an optical platform,
   an optical package, or
   an optical housing.

14. The wavelength selective switch of claim 11, wherein the third CTE is substantially matched to the first CTE.

15. The wavelength selective switch of claim 11, wherein the first CTE and the third CTE are less than the second CTE.

* * * * *

UNITED STATES PATENT AND TRADEMARK OFFICE
CERTIFICATE OF CORRECTION

| | |
|---|---|
| PATENT NO. | : 11,845,257 B2 |
| APPLICATION NO. | : 17/304248 |
| DATED | : December 19, 2023 |
| INVENTOR(S) | : Abdul Jaleel K. Moidu |

It is certified that error appears in the above-identified patent and that said Letters Patent is hereby corrected as shown below:

In the Claims

In Claim 1, Column 7, Line 48, "the hole in center portion" should be changed to -- the hole in the center portion --

In Claim 1, Column 7, Line 52, "the hole in center portion" should be changed to -- the hole in the center portion --

In Claim 11, Column 9, Line 11, "in the center of the" should be changed to -- in the center portion of the --

Signed and Sealed this
Twenty-eighth Day of May, 2024

*Katherine Kelly Vidal*

Katherine Kelly Vidal
*Director of the United States Patent and Trademark Office*